United States Patent [19]
Callahan et al.

[11] 3,710,991
[45] Jan. 16, 1973

[54] FLUENT MATERIAL DISPENSER WITH SCREW DISCHARGE ASSISTANT

[75] Inventors: William H. Callahan; Royal F. Smith, both of Aurora, Ill.

[73] Assignee: Liktro-Vend Corp., Aurora, Ill.

[22] Filed: July 23, 1971

[21] Appl. No.: 165,543

Related U.S. Application Data

[63] Continuation-in-part of Ser. No. 866,663, Oct. 15, 1969, abandoned.

[52] U.S. Cl. ................222/413, 222/504, 222/505, 222/512
[51] Int. Cl. ..............................................G01f 11/20
[58] Field of Search.......222/413, 504, 505, 512, 561

[56] References Cited

UNITED STATES PATENTS

| | | | |
|---|---|---|---|
| 1,742,562 | 1/1930 | Savoy | 222/505 |
| 2,598,227 | 5/1952 | Constantine | 222/413 X |
| 2,670,883 | 3/1954 | Ajero | 222/512 X |
| 3,399,809 | 9/1968 | Simonieh | 222/504 X |

FOREIGN PATENTS OR APPLICATIONS

| | | | |
|---|---|---|---|
| 1,249,212 | 11/1960 | France | 222/413 |

*Primary Examiner*—Samuel F. Coleman
*Attorney*—Robert V. Jambor et al.

[57] ABSTRACT

A fluent solid material dispensing mechanism including a motor driven auger operable upon a timed cycle to provide positive discharge of a metered quantity of base product from a discharge orifice and a seal assembly associated with the discharge orifice to prevent ingress of airborne moisture and movable in synchronization with the auger to allow discharge of the fluent material.

10 Claims, 4 Drawing Figures

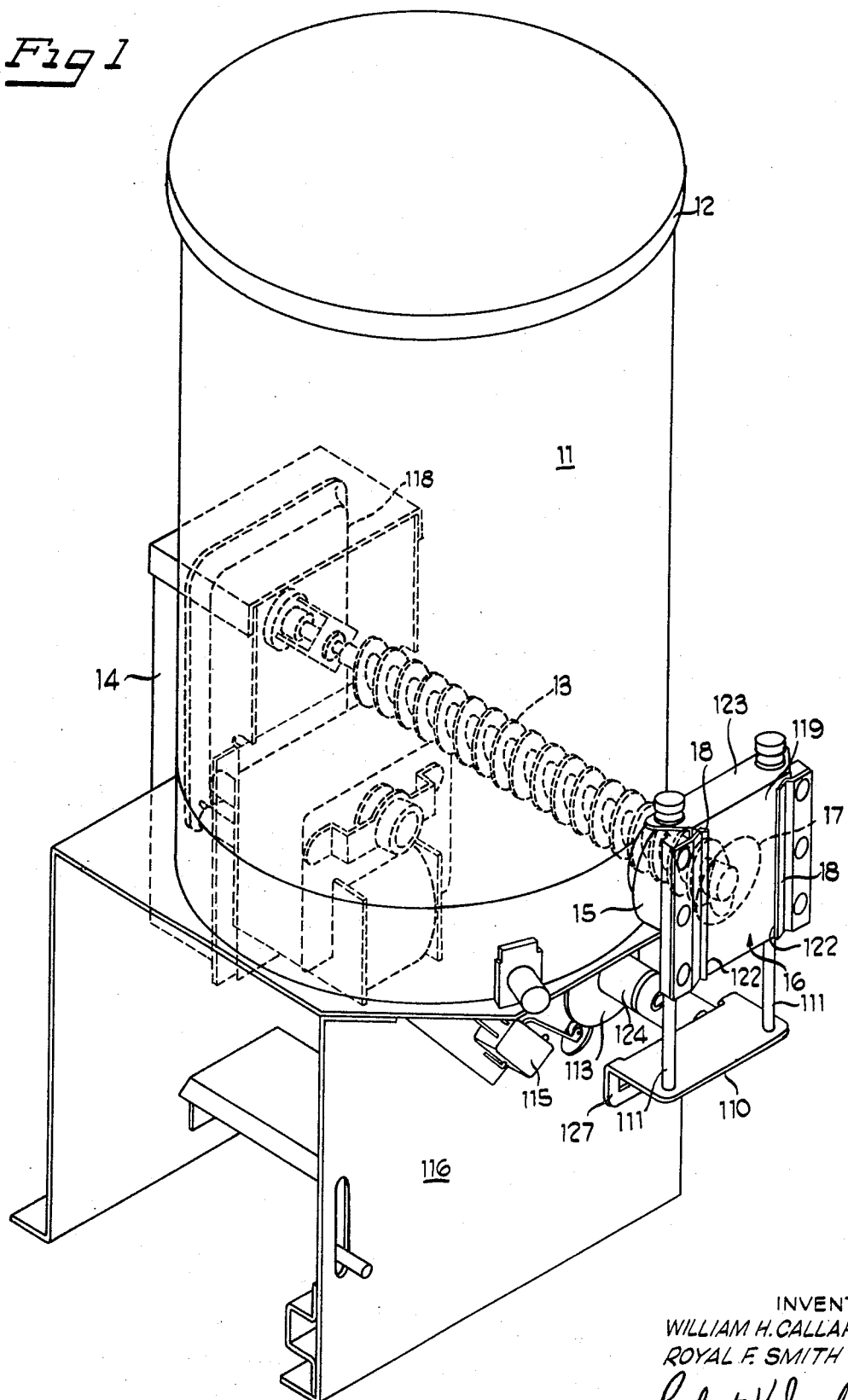

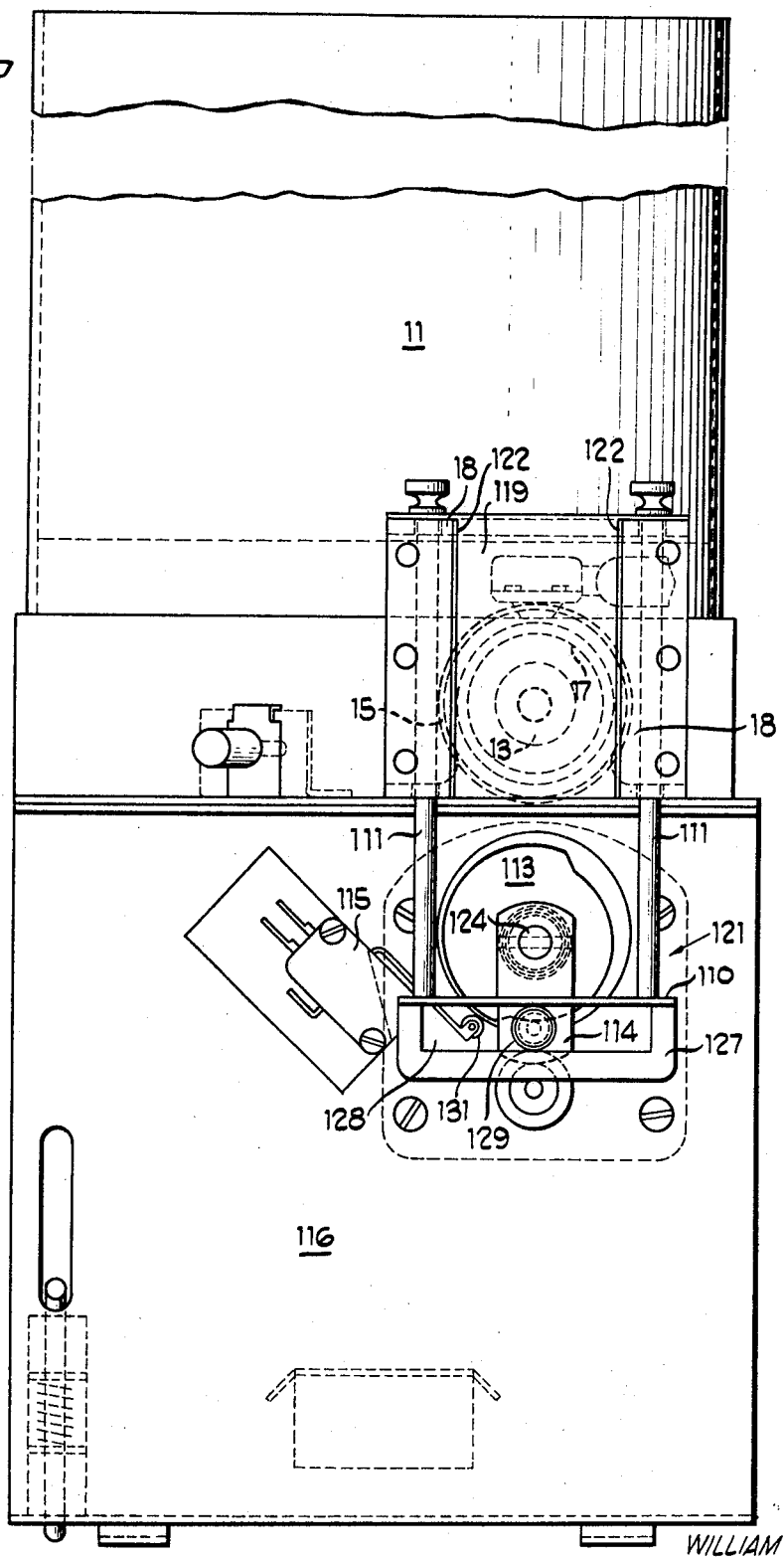

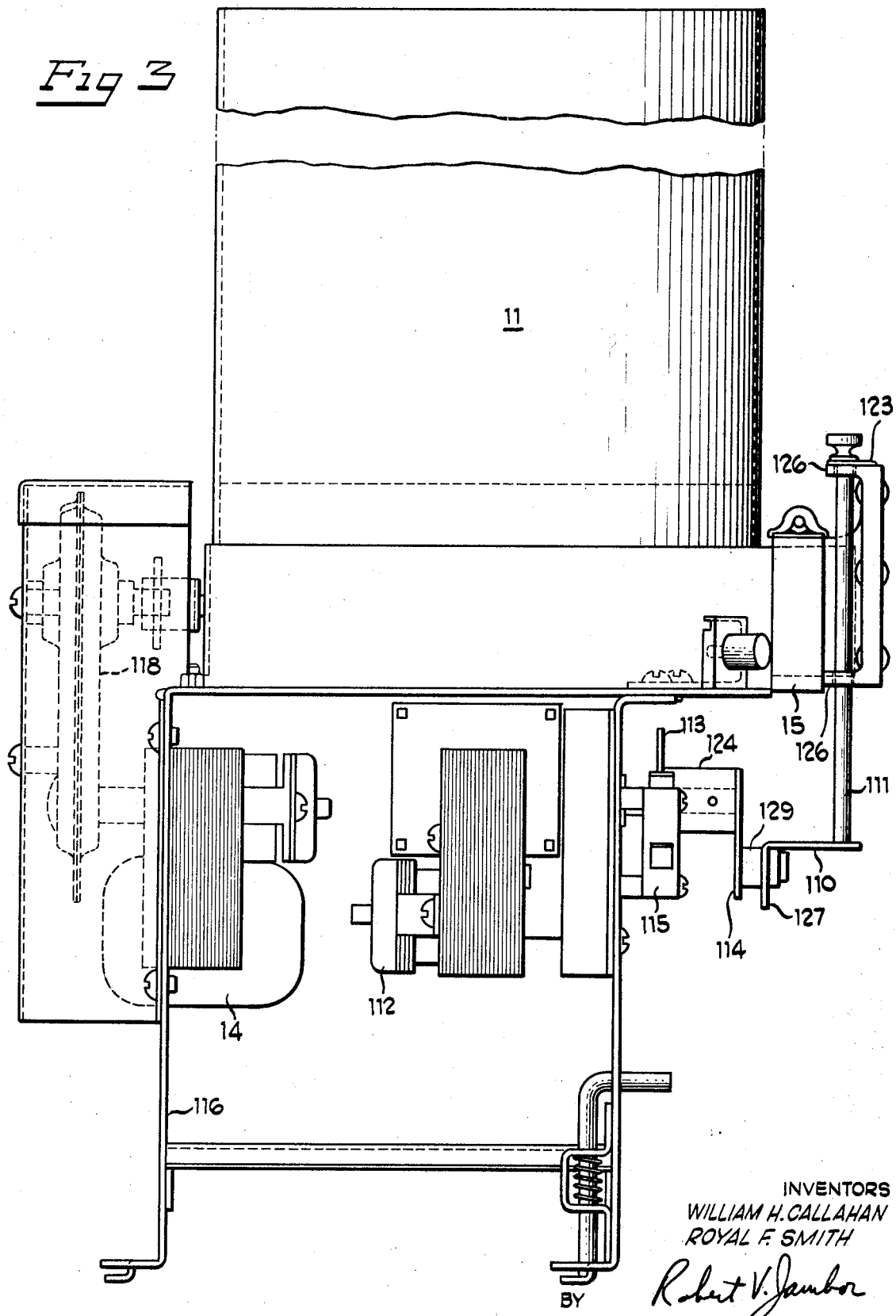

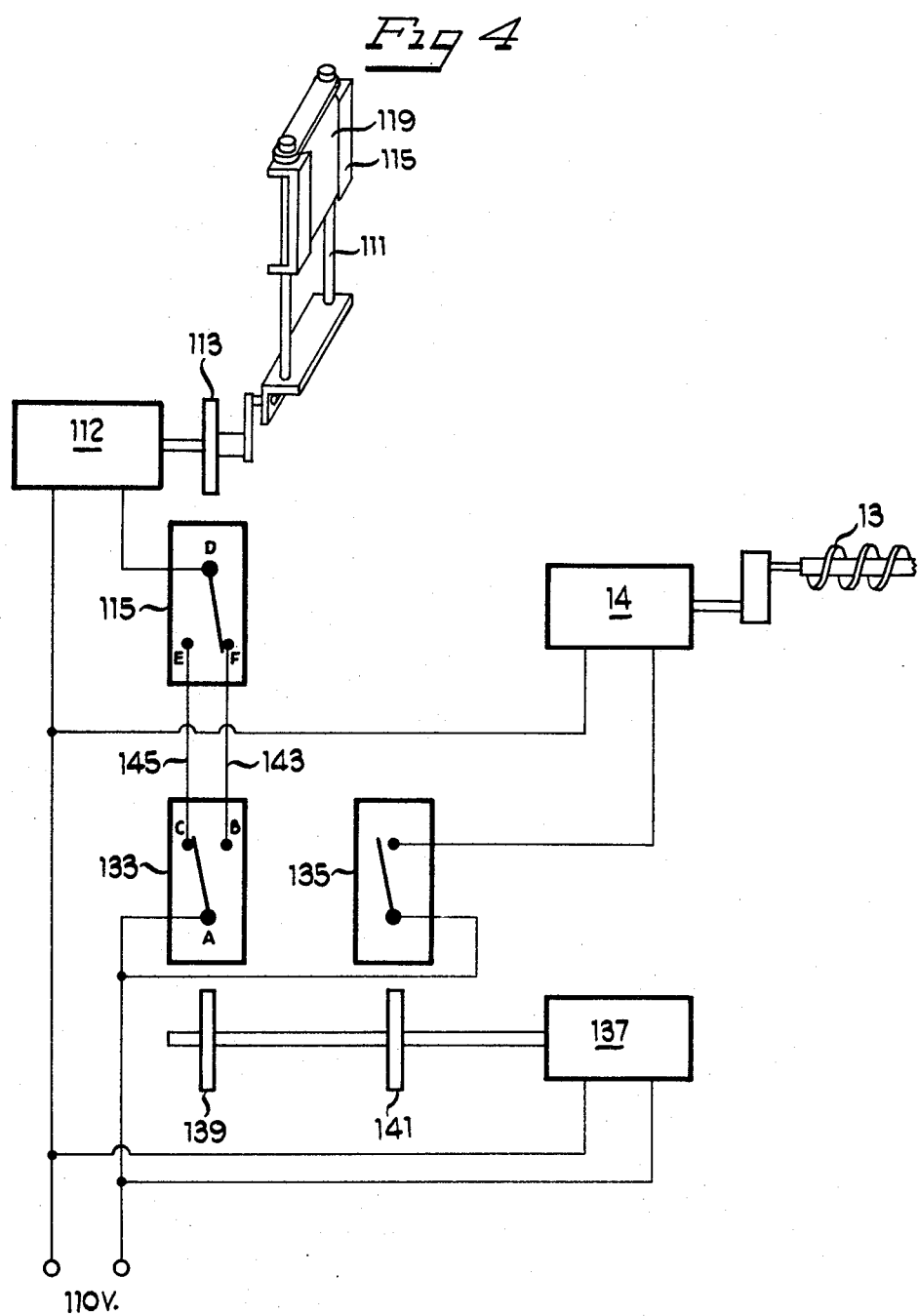

FLUENT MATERIAL DISPENSER WITH SCREW DISCHARGE ASSISTANT

CROSS-REFERENCE TO RELATED APPLICATION

This application is a continuation-in-part application of application for United States Letters Patent Ser. No. 866,663, filed Oct. 15, 1969, now abandoned entitled "DISPENSING MECHANISM" by William H. Callahan and Royal F. Smith.

BACKGROUND OF THE INVENTION

This invention relates to a fluent solid material dispensing mechanism. More particularly, it relates to a fluent solid material dispensing mechanism used in connection with coin operated vending of beverages.

A relatively new form of pre-brewed product for the preparation of a coffee beverage is known as "freeze dried" coffee. The product is prepared by removing water by a rapid freeze process. This base product is a fluent solid and is reconstituted merely by the replacement of water.

"Freeze dried" coffee has become quite popular because of the simplicity of preparation of the beverage and the marked similarity of the flavor to freshly brewed coffee. These factors have made "freeze dried" coffee very desirable for application in the coin operated vending of coffee beverages. It possesses many advantages over dried instant as well as fresh brewed vending systems and provides a product readily accepted by even the most discriminating purchaser.

A problem has been encountered, however, in the vending of coffee beverages made from a "freeze dried" base product. "Freeze dried" coffee base, because of its extreme hydrocopicity, requires that the dehydrated form be maintained at a low moisture content in order to retain its fluent characteristics and to thereby avoid agglomeration and consequent fouling and failure of the dispensing mechanism. If liquid moisture or moisture vapor is permitted to contact particles of "freeze dried" coffee and for that matter many other such hygroscopic food materials, the particles become sticky, tending to agglomerate and to adhere to adjacent and surrounding surfaces.

None of the systems previously used in the vending of instant coffee base product or coffee grounds in fresh brewed coffee vending machines have been found suitable for application to the vending of "freeze dried" coffee. These prior systems were either incapable of dispensing base product in accurately controlled dosages or did not provide adequate protection against moisture contamination.

Certain of these earlier systems included a gravity fed measuring chamber and associated sliding gate or shutter which alternately provided communication with a supply of base product and a discharge orifice. The volume of base product present in the storage container, degree of compaction of the product and other factors contributed significantly to inaccuracy in dosage. Further, the measuring chamber was exposed during portions of the cycle to moisture laden air and protection against contamination and attendant caking of base product was unavoidable.

Later systems employed screw conveyors or augers driven by electric motors for a timed interval to dispense a metered amount of base product. These systems are commonly used in connection with the dispensing of the instant coffee base, and also related fluent particulate materials such as sugar and powdered cream. The discharge nozzles of these auger arrangements are completely exposed to the environment present within the vending machine and therefore are totally unsuitable for application to unstable base products such as "freeze dried" coffee.

Accordingly, it is the principal object of the present invention to provide an improved form of dispensing mechanism for fluent solid particulate material which provides accurate dosage and protection against moisture contamination.

SUMMARY OF THE INVENTION

Very generally, the present invention is directed to a dispensing mechanism including a motor driven auger operable upon a timed cycle to provide positive discharge of a metered quantity of fluent base product from a discharge orifice and a closure member associated with the discharge orifice to prevent ingress of airborne moisture which closure is movable in synchronization with the auger to allow discharge of the fluent material.

Particular objects and advantages of the present invention will become apparent with reference to the following description and accompanying drawings.

DESCRIPTION OF THE DRAWINGS

FIG. 1 is a perspective view of a dispensing mechanism illustrative of the principles of the present invention.

FIG. 2 is a front elevational view of the apparatus of FIG. 1.

FIG. 3 is a side elevational view of the apparatus of FIG. 1.

FIG. 4 is a schematic diagram illustrating a modified form of the invention.

DETAILED DESCRIPTION

Turning now to the drawings, there is shown a dispensing mechanism embodying the principles of the present invention. In use, the dispensing mechanism forms a part of a coin operated vending machine (not shown) suitable for dispensing beverages such a hot coffee, tea, soup and other consumable beverages. The vending machine itself and associated components such as the water supply system, coin mechanism and the like may be of any suitable type and form no part of the present invention.

The dispensing mechanism includes a storage canister 11, a metering auger or screw conveyor 13 and a seal assembly 16 associated with the auger to prevent exposure of stored material to the environment present within the vending machine.

The canister is supported upon a frame 116 and includes a hollow cylinder having a closed bottom and an open top through which a quantity of base material such as "freeze dried" coffee product may be placed inside the canister. The top is sealed from the vending machine environment by a lid 12.

A nozzle housing 15 is secured to the canister 11 adjacent the closed bottom in overlying relation to an appropriately formed aperture in the canister. The nozzle housing 15 includes an internal bore which defines a discharge orifice 17 through which the base material is dispersed. The orifice is aligned with other components of the vending machine (not shown) such as a mixing bowl or the like, where water and other ingredients are added to complete the beverage producing process.

The nozzle housing includes web portions 126, best seen in FIGS. 2 and 3, which define pairs of vertically aligned guide apertures indicated in dashed lines of those figures.

The auger 13 is rotatably supported within the canister 11 and includes an end portion terminating within the internal bore of nozzle housing 15. Rotation of the auger causes positive displacement of a quantity of fluent material axially through the internal bore of the nozzle housing 15. This material is dispensed through the discharge orifice 17. The amount of material conveyed is accurately determined by the auger dimensions, pitch and speed of rotation, as well as the time duration of the conveying cycle.

An opposite end of the auger extends outwardly of the canister and is connected through a reduction gear system 118 to a drive motor 14 supported by the frame 116. Energization of the motor 14 causes rotation of the auger and delivery of a predetermined quantity of fluent material to the beverage producing components of the vending machine.

In accordance with the present invention, the seal assembly 16 provides an effective seal against ingress of moisture through the discharge orifice 17. The seal provided by the assembly 16 prevents deterioration of the base product retained in the canister 11 and precludes the possibility of clogging or caking of the product upon the auger end or within the internal bore of the nozzle housing 15. In this way, accurate dosage of dry base product is assured for each cycle of operation.

The seal assembly 16 includes a slidable closure 119, a drive motor 112, actuator mechanism 121 and retainer springs 18.

The closure 119 is slidably mounted upon the nozzle housing 15 in overlying relation to the discharge orifice 17 and is urged into sealing contact with the nozzle housing by the springs 18. The springs are secured to the nozzle housing and include lip portions 122 contacting the closure 119. The springs thus provide a slide channel for the closure member and, in addition, maintain sealing contact between the closure member and the nozzle housing.

The closure member 119 includes a flange 123 connected to the actuator mechanism 121 which effects movement of the closure member between open and closed positions upon energization of motor 112.

The actuator mechanism 121 includes a pair of elongated drive rods 111 connected to the flange 123 of the closure member 119. These rods are slidably supported within the guide apertures formed in the web portions 126 of the nozzle housing 15. The rods are secured to a drive bracket 110 which includes a flange 127 provided with an elongated slot 128. Vertical displacement of the drive bracket causes the rods to slide vertically within the guide apertures. The rods in turn effect vertical upward movement of the closure member 119 to expose the discharge orifice 17. Vertical downward displacement of the drive bracket causes similar downward movement of the rods and consequent downward movement of the closure member 17 to seal the discharge orifice.

The motor 112 is supported upon the frame 16 and includes an output shaft 124 to which is secured a crank 114. The eccentric crank 114 includes an actuator 129 disposed within the slot 128 of the drive bracket 110 as best seen in FIG. 2. The lateral width of the slot is sufficient to accommodate the rotary path defined by the actuator 129 during motor operation.

The interengagement of the actuator 129 and slot 128 of the flange 127 thereby translate the rotary motion of the output shaft 124 of the motor 112 into reciprocal motion. This reciprocal motion is then transferred through the slidable rods 111 to the closure member 119.

As can be readily appreciated, one revolution of the motor shaft 124 will provide one complete cycle of movement of the closure member from its closed position shown in the drawings to an open position displaced vertically upwardly exposing the discharge orifice 17 and back to the closed position.

The motor 112 is electrically connected to the circuitry of the vending machine in a manner to provide one revolution of the motor shaft each dispensing cycle. Thus, each time a sufficient number of coins are placed in the vending machine, the motor 112 is energized to provide one revolution of the motor shaft. This in turn causes the closure member 119 to travel through one complete cycle from its closed position to its full open position and back to its closed position.

The shaft 124 of the motor 112 is additionally provided with a cam 113 which rotates with the shaft. A switch 115 is mounted upon the frame 116 in operative association with the cam. The switch includes a cam follower 131 best seen in FIG. 2 which opens and closes the switch in accordance with the cam profile. In the embodiment of FIGS. 1 through 3, the switch 115 is electrically connected with the auger motor 14. When the switch is closed the auger motor is energized and the auger is caused to rotate to dispense fluent material from the discharge orifice 17. When the switch is open, the auger is stationary and no material dispersed.

The cam profile is designed to close the auger motor circuit for a predetermined period of time to control the quantity of material delivered to the orifice 17. Further, it is designed to provide a slight delay in energization of the auger motor with respect to energization of the motor 112 to provide at least partial opening of the orifice 17 by the closure member 119 prior to initiation of the dispensing action. The duration of auger motor operation during each cycle and the beginning and ending points of the delivery cycle of the auger 13 can be readily adjusted by modification of the profile of the cam 113 in a well known manner.

Activation of the vending machine by deposit of the appropriate coinage energizes the motor 112 for one cycle or one revolution. The crank 114, through interengagement of the actuator 129 and slot 128 cause the closure member 119 to move upwardly to uncover the discharge orifice 17.

At a predetermined point of the cycle of motor 112, the cam 113 closes switch 115 through follower 131. This energizes motor 14 which causes rotation of the auger 13 through the gear reduction drive 118. Particulate fluent material is displaced axially through the internal bore of the nozzle housing 15 by the auger and out the discharge orifice 17 which has already been at least partially uncovered by movement of the closure member.

Dispensing continues as the closure member moves upwardly to its maximum open position and begins to return downwardly to its closed position. After a desired quantity of material is dispensed, the cam 113 and follower 131 open the electric circuit to motor 14 and rotation of the auger terminates. The closure member continues to move downwardly until one complete cycle of motor 112 is completed and the closure member has been returned to its initial position completely sealing the discharge orifice 17. As the closure member moves to its sealing position, it cleans the nozzle housing areas surrounding the discharge nozzle to prevent caking of any material exposed to moisture laden air during the dispensing cycle. Once closed, the seal assembly 16 prevents ingress of moisture laden air and maintains the stored material in a dry state ready for a subsequent dispensing cycle.

Referring now to the electrical schematic shown in FIG. 4, there is illustrated an alternate arrangement for controlling the operation of the closure member 119 and metering auger 13. In this arrangement, an additional pair of timing switches 133 and 135 are utilized, and the switch 115 is connected to control operation of the closure member motor 112 rather than the auger motor 14.

Switches 133 and 135 designated the closure actuator switch and metering timer switch, respectively, are operated by cams driven by a cycle timing motor 137. The motor 137 is connected to an output shaft upon which are mounted switch actuator cams 139 and 141. The motor 137 is connected to the vending machine electrical circuitry in a manner such that deposit of the proper coinage will cause the shaft and attached cams to rotate one revolution. This causes the cams to actuate the switches to effect opening of the closure member 119, operation of the auger to dispense a predetermined quantity of fluent material, and closure of the member 119.

The switch 135 is disposed between the power supply and the auger drive motor 14. The switch is normally open and is closed by the cam 141 for a time period determined by the cam profile to effect rotation of the metering auger 13.

Switch 133, switch 115 operated by the cam 113, and closure member motor 112 are connected in a three wire circuit which controls movement of the closure member 119 between open and closed positions during each cycle of the machine. The switch 133 includes a normally open position A-B and a normally closed position A-C. Movement of the switch between these positions is controlled by the cam 139.

Switch 115 is also a two-position switch, having a normally closed position D-F and a normally open position D-E. Cam 113, which controls switch 115, is a half-cycle cam. It maintains switch 115 in the normally closed position D-F for the first half-cycle of the vending cycle and then switches it to position D-E for the second half-cycle.

Energization of the timing motor 137 causes the cam 139 to move the switch 133 to the closed position A-B. Since switch 115 is in the normally closed position D-F, motor 112 is energized through conductor 143 and closure member 119 is moved to the open position. This also causes rotation of cam 113. When the closure member has reached the full open position, switch 115 moves to position D-E. This opens the circuit through conductor 143 and closure member motor 112 is de-energized.

Subsequent to energization of closure member motor 112 by switch 133 to cause the closure member 119 to open, switch 135 is closed by cam 141 causing auger 13 to rotate and dispense fluent material. The profile of the cam 141 determines the duration of auger operation and length of auger operation, in turn, determines the amount of material dispensed.

After switch 135 opens to terminate auger rotation, cam 139 causes switch 133 to move to position A-C. This closes the circuit to auger motor 112 through conductor 145 and position D-E of half-cycle switch 115. Motor 112 is again energized, causing closure member 119 to move to the closed position and seal off the discharge orifice 17.

Energization of the motor 112 also causes rotation of cam 113. When the closure member 119 has reached the fully closed position, cam 113 causes switch 115 to move to position D-F. This opens the circuit through conductor 145 and closure member motor 112 ceases to operate. The switches 133, 135 and 112 are thus all in position to repeat the cycle upon re-energization of the timing motor 137.

With the arrangement illustrated in FIG. 4, the metering auger operates to dispense fluent material only during portions of the cycle when the closure member 119 is in the open position. This precludes possible binding of the auger due to restriction of the discharge orifice 17 by the closure member.

Various features of the present invention have been particularly shown and described. However, it must be appreciated that various modifications may be made without departing from the scope of the invention.

What is claimed is:

1. A dispensing mechanism for dispensing a quantity of fluent material comprising, a canister adapted to retain material to be dispensed, a nozzle housing connected to said canister having an internal bore and defining a discharge orifice, a rotatable auger disposed internally of said canister, said auger having an end portion disposed within said internal bore and terminating adjacent said discharge orifice, a seal assembly connected to said nozzle housing sealing said discharge orifice to prevent ingress of environmental airborne moisture, said seal assembly including a closure member slidably supported upon said nozzle assembly and movable between a closed position overlying said orifice and an open position exposing said orifice to allow discharge of material, drive means operatively associated with said closure member operable to move said closure member between said open and closed positions, drive means operatively associated with said auger to effect rotation of said auger, and timing means for cyclic activation of both said drive means, said timing means activating said closure member drive means during each said cycle to effect movement of said closure member between said closed and open positions and activating said metering auger drive means for a predetermined portion of said cycle to effect rotation of said auger to dispense a metered quantity of fluent material.

2. A dispensing mechanism as claimed in claim 1 wherein said seal assembly includes a pair of elongated drive rods connected to said closure member and slidably supported by said nozzle housing, and a drive bracket connected to said drive rods including a flange defining an elongated slot, and said drive means associated with said closure member includes an electric motor including an output shaft, and a crank rotatably connected to said output shaft; said crank including an actuator interengaging said slot, energization of said motor effecting rotation of said crank to impart reciprocal motion to said drive bracket, drive rods and closure member to move said member between said open and closed positions.

3. A dispensing mechanism as claimed in claim 1 wherein said drive means associated with said closure member includes an electric motor operable to move said closure member between said open and closed positions, said drive means associated with said auger includes an electric motor operable to effect rotation of said auger, and said timing means includes means activated by operation of said electric motor associated with said closure member to control operation of said electric motor associated with said auger during movement of said closure member between said open and closed positions.

4. A dispensing mechanism as claimed in claim 3 wherein said timing means includes a cam secured to said output shaft of said electric motor associated with said closure member and a switch operable by said cam to energize and de-energize said motor associated with said auger.

5. A dispensing mechanism as claimed in claim 1 wherein said timing means includes means to activate said closure member drive means to move said closure member to said open position, means to deactivate said closure member drive means to retain said closure member in said open position, means to activate said auger drive means for a predetermined period during said cycle, and means to reactivate said closure member drive means to cause said member to move to said closed position to complete said cycle.

6. A dispensing mechanism as claimed in claim 5 wherein said seal assembly includes a pair of elongated drive rods connected to said closure member and slidably supported by said nozzle housing, and a drive bracket connected to said drive rods including a flange defining an elongated slot, and said drive means associated with said closure member includes an electric motor including an output shaft, and a crank rotatably connected to said output shaft, said crank including an actuator interengaging said slot, energization of said motor effecting rotation of said crank to impart reciprocal motion to said drive bracket, drive rods and closure member to move said member between said open and closed positions.

7. A dispensing mechanism as claimed in claim 5 wherein said closure member drive means includes an electric motor, and wherein said timing means includes a switch positionable to activate said closure member drive motor when said member is in the closed position to move said member to said open position, a switch positionable to de-energize said closure member drive motor when said closure member is in said open position, said first-mentioned switch being further positionable to reactivate said closure member drive motor when said member is in said open position to move said member to said closed position, to complete said cycle.

8. A dispensing mechanism as claimed in claim 7 wherein said drive means associated with said auger includes an electric motor and said timing means includes a switch positionable to energize said auger drive motor for a predetermined period during said cycle.

9. A dispensing mechanism as claimed in claim 8 wherein said timing means includes rotatable cams associated with said switches effective to position said switches.

10. A dispensing mechanism as claimed in claim 9 wherein said cam associated with said switch positionable to de-energize said closure member drive motor when said member is in said open position is driven by said closure member drive motor.

* * * * *